United States Patent
Brown

[15] 3,681,709
[45] Aug. 1, 1972

[54] DIFFRACTION COUPLED LASER OSCILLATOR FOCUSING SYSTEM

[72] Inventor: Clyde Owen Brown, Newington, Conn.

[73] Assignee: United Aircraft Corporation, East Hartford, Conn.

[22] Filed: Jan. 27, 1970

[21] Appl. No.: 6,089

[52] U.S. Cl. .................................................331/94.5
[51] Int. Cl. ...................................................H01s 3/00
[58] Field of Search ....................................331/94.5

[56] References Cited

UNITED STATES PATENTS 3,395,368  7/1968  Koester..........................331/94.5
3,541,323  11/1970  Stewart et al. ............331/94.5 X
3,363,196  1/1968  Eknayan......................331/94.5

OTHER PUBLICATIONS

" Improved Laser Angular Brightness Through Diffraction Coupling," 3 Applied Optics 981.

Primary Examiner—Ronald L. Wibert
Assistant Examiner—Conrad Clark
Attorney—Melvin Pearson Williams

[57] ABSTRACT

A plurality of mirrors is arranged in spaced relationship forming a laser oscillator cavity, a diffraction coupler and a focusing system. The oscillator cavity is formed between a concave mirror and a flat centrally located compound convex mirror, the cavity being proportioned to provide oscillation of the laser electromagnetic energy in the fundamental mode and the convex mirror being formed to diffract laser energy out of the oscillator. An annular mirror positioned intermediate to said concave and convex mirrors, collects said diffracted energy and focuses it as a nearly diffraction limited laser spot at the work area.

5 Claims, 5 Drawing Figures

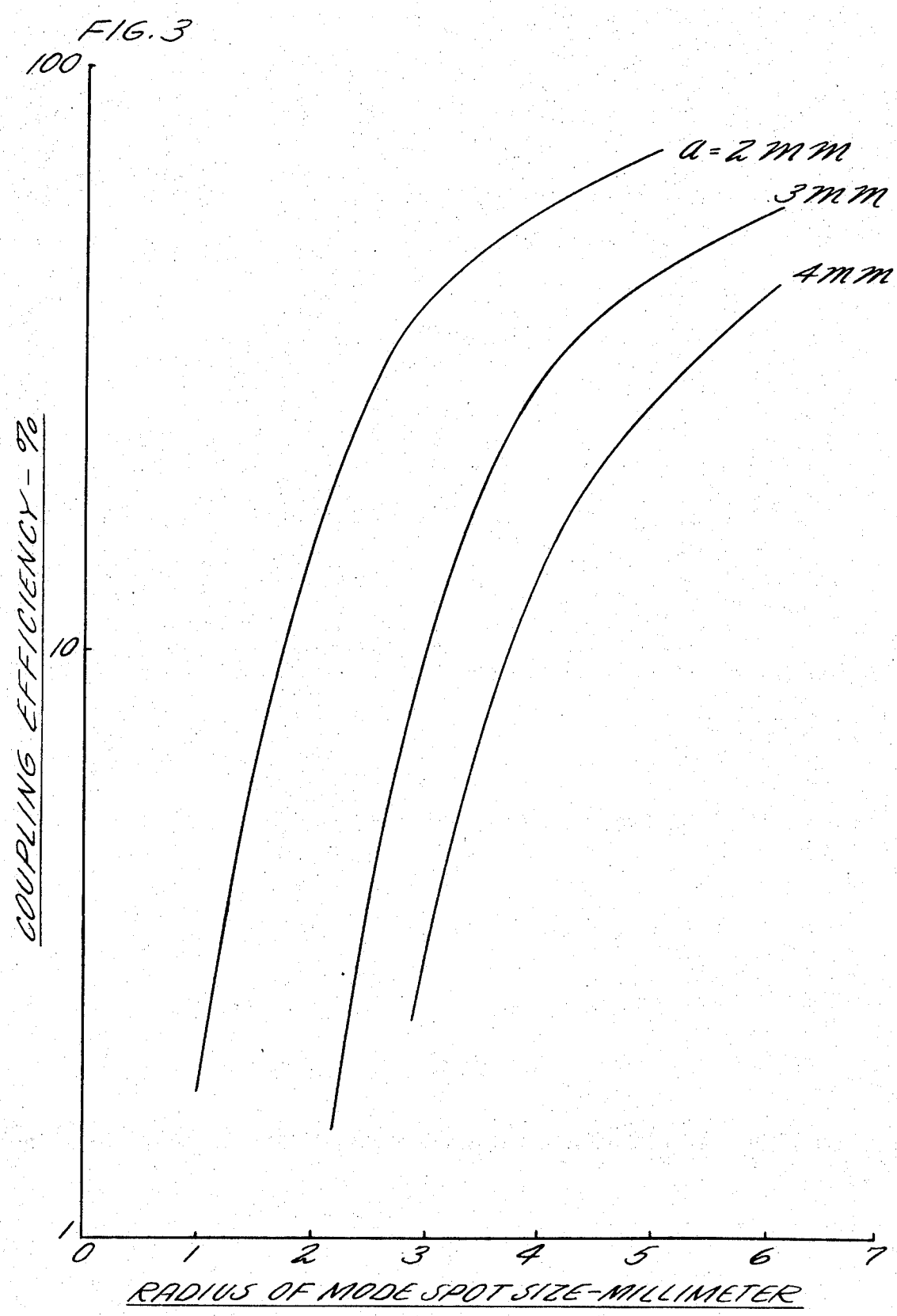

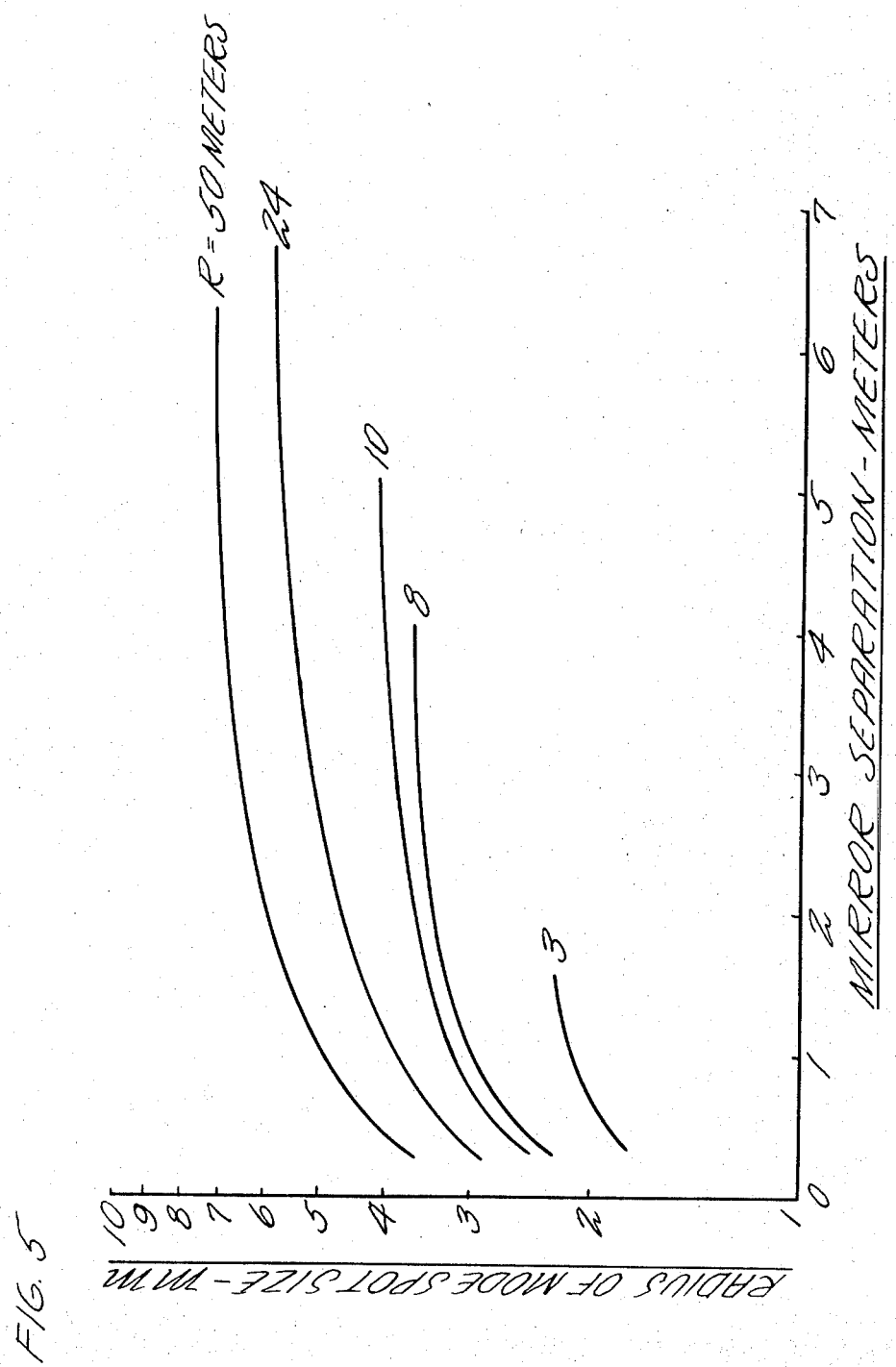

DIFFRACTION COUPLED LASER OSCILLATOR FOCUSING SYSTEM

BACKGROUND OF THE INVENTION

1. Field of the Invention

This invention relates to lasers and more particularly to a diffraction coupled-focusing laser oscillator system.

2. Description of the Prior Art

With the availability of high power laser beams, various attempts are being made to utilize this new form of power in metal working, particularly welding, hole drilling and cutting. It has been determined that to accomplish such operations competitively, the apparatus must be capable of high power density output, able to obtain the nearly diffraction limited spot size of a focused laser beam, and must precisely locate the output focal point. To meet these objectives one needs a laser source of sufficiently high power, a technique for efficiently extracting the high power laser energy from the source, and appropriate means to focus the beam at the workpiece.

The laser source is readily available: gas lasers, particularly the nitrogen/carbon dioxide gas laser concept, have been developed and can produce the necessary power. It is the extraction of high quality, high power laser energy from the optical cavity and the focusing of such energy at the workpiece that has impeded the development of metal working by lasers.

Removing the electromagnetic energy from an oscillator cavity is generally done by either hole coupling or partially transparent mirror techniques. Each of these techniques has its limitations. Hole coupling interferes with the mode pattern within the cavity. Placing a hole or holes in a mirror for energy removal tends to shift the peak intensity of the laser to the surfaces immediately adjacent to a hole resulting in increased heating of the surfaces and further resulting in a perturbation in the intensity profile of the laser beam. Energy removal by partially transparent mirrors can be an effective technique for low power lasers, however, at the power levels generally required for metal working, the transmitting mirror absorbs sufficient energy to cause excessive and sometimes destructive internal heating of the mirror for several reasons and is inefficient. First, there is a problem in finding suitable materials to transmit the electromagnetic energy at the usual wavelengths involved. In the case of a carbon dioxide system, the laser output is in the infrared range and there are few materials with suitable transmissivity to be useful as partially transparent mirrors. Of the materials available, most are hygroscopic and therefore require protection from the atmosphere to preserve their physical properties. Semiconductor materials such as gallium arsenide and germanium are suitable in some respects but each has a relatively high absorption coefficient for infrared range wavelengths at low temperature and a characteristic increase in absorption with increased temperature. This represents a runaway condition, and prohibits the use of such material unless sufficient mirror cooling can be provided, and even then usually only in a low power application.

Previous attempts have been made to remove laser energy from a laser oscillator and focus it at a work area with fully reflecting mirrors thus avoiding the problems discussed. These efforts were found impractical because of the inefficiency in guiding the laser energy from the source to the work area.

SUMMARY OF THE INVENTION

A principal object of this invention is to deliver all of the energy coupled out of a laser oscillator cavity through a focusing system.

Another object of this invention is to efficiently couple out electromagnetic energy from a laser oscillator into a focusing system.

A further object of this invention is to deliver to a work area laser energy having a diffraction limited spot size.

According to the present invention, a concave annular mirror cooperates with a diffraction coupled laser oscillator having a compound convex mirror comprising a curved outer surface and a central flat surface, said flat surface forming one end of a laser oscillator region, said curved surface coupling laser energy from the oscillation region and said annular mirror focusing said coupled energy at an area of interest.

In accordance with the embodiment of this invention, the mirrors are arranged to provide oscillation in the fundamental mode.

An advantage of this invention is the capability of providing a laser spot having sufficient depth of field to get deep penetration in materials up to several inches in thickness.

A further advantage of this invention is that the convex mirror provides beam expansion and thereby permits a long focal length system while still maintaining a small focused spot size.

The foregoing and other objects, features and advantages of the present invention will become more apparent in the light of the following detailed description of the preferred embodiments thereof as illustrated in the accompanying drawings.

BRIEF DESCRIPTION OF THE DRAWINGS

FIG. 3 is a graph illustrating the effect which the mode spot size has on the coupling efficiency for typical diameters of the convex mirror flat surface;

FIG. 4 is a simplified illustration of various parameters of the embodiment of FIG. 1; and FIG. 5 is a graph illustrating the effect on mode spot size of the oscillator mirror separation for different radii of curvature of the concave mirror.

DESCRIPTION OF THE PREFERRED EMBODIMENT

Figure 1:
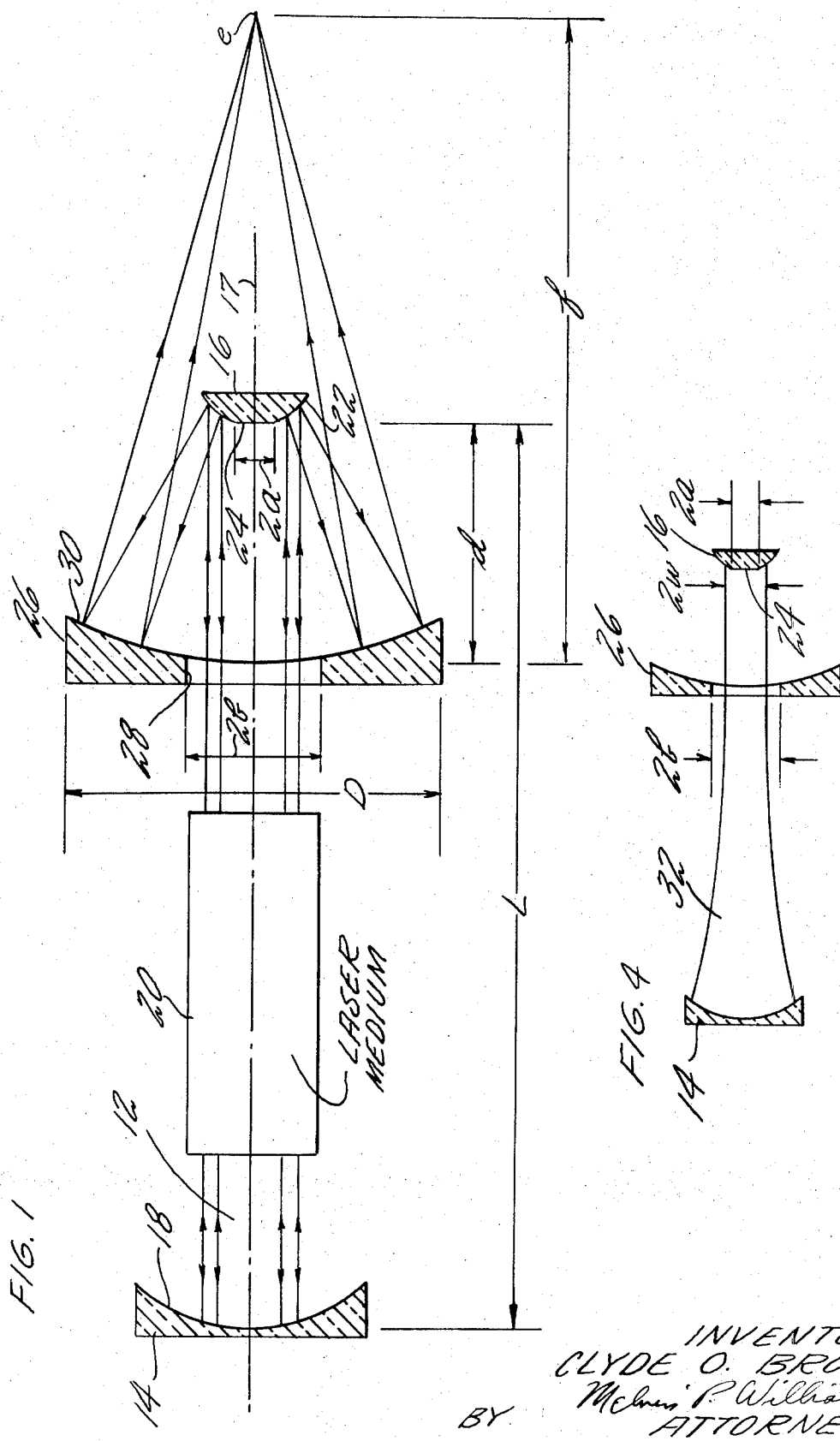
FIG. 1 is a schematic illustration of a diffraction coupled laser oscillator focusing system in accordance with the present invention.

Referring to FIG. 1, a cavity 12 includes a concave mirror 14 and a compound mirror 16 along a common axis 17. The concave mirror 14 has a spherical reflection surface 18 and a radius of curvature R14, and forms one end of the laser oscillator cavity 12 of length L. A laser medium 20, which may be gas or any other suitable medium, is provided in the laser cavity. The compound mirror 16 has a convex reflection surface 22 with a radius of curvature R16 and a flat circular surface 24, normal to the axis 17, which forms the other end of the laser oscillator cavity 12. An annular mirror 26 has a central hole 28 therethrough and a concave spherical surface 30 with a radius of curvature R26, and is positioned symmetrically about the axis 17 and between the mirrors 14, 16. The reflection surface 30 faces the mirror 16 and is in optical communication with the reflection surface 22.

The separation distance, characteristic dimensions, and the alignment of the mirrors must all be maintained within very close tolerances for proper operation of the system in order to deliver all of the energy coupled out of the oscillator as a diffraction limited spot at the work area.

The size, shape and separation of the concave mirror 14 and the compound mirror 16 are necessarily confined to a range of interrelated values. The distance of separation (length of the optical cavity-L) between the mirror 14, 16 limits the radius of curvature R14 of the concave mirror to the extent that $$2L < R14.$$

This relationship will force the oscillator to operate in a mode structure which covers a relatively large portion of the concave surface 18, and the mode shape tapers (FIG. 4) to a diameter at the surface of the compound mirror equal to $2w$ ($w$ is the radius of the mode spot size in the plane containing the flat surface 24 and normal to the axis 17). The dimension $w$ is larger than the dimension $a$ (the radius of the circular surface 24) but not so large that a sufficient amount of energy is coupled out of the oscillator cavity to force the laser out of the fundamental mode of oscillation. In the preferred embodiment, $w$ is slightly larger than $a$ and approximately thirty to forty percent of the energy in the fundamental mode is coupled out. The Fresnel number of the oscillator is defined as $$N_f = a^2/L\lambda$$

where
  $N_f$ = Fresnel number
  $a$ = radius of the cavity
  $L$ = length of the cavity and
  $\lambda$ = wavelength of the radiation.

The dimension $a$ is chosen to provide a Fresnel number of, preferably, approximately unity to allow for diffraction of a sizable amount of laser energy out of the oscillator cavity. Quantitatively, large $N_f$ values result in small diffraction losses in the dominant modes and, conversely, small $N_f$ values can result in a relatively larger diffraction loss.

The magnitude of $w$ is determined by the relationship $$w = \left[\frac{\lambda L}{\pi}\right]^{1/2} \left[\frac{R14 - L}{L}\right]^{1/4}$$

where
  $w$ = radius of the mode spot size
  $\lambda$ = wavelength of the radiation
  $L$ = distance between the mirrors and
  $R14$ = radius of curvature of the concave mirror.

Figure 2:
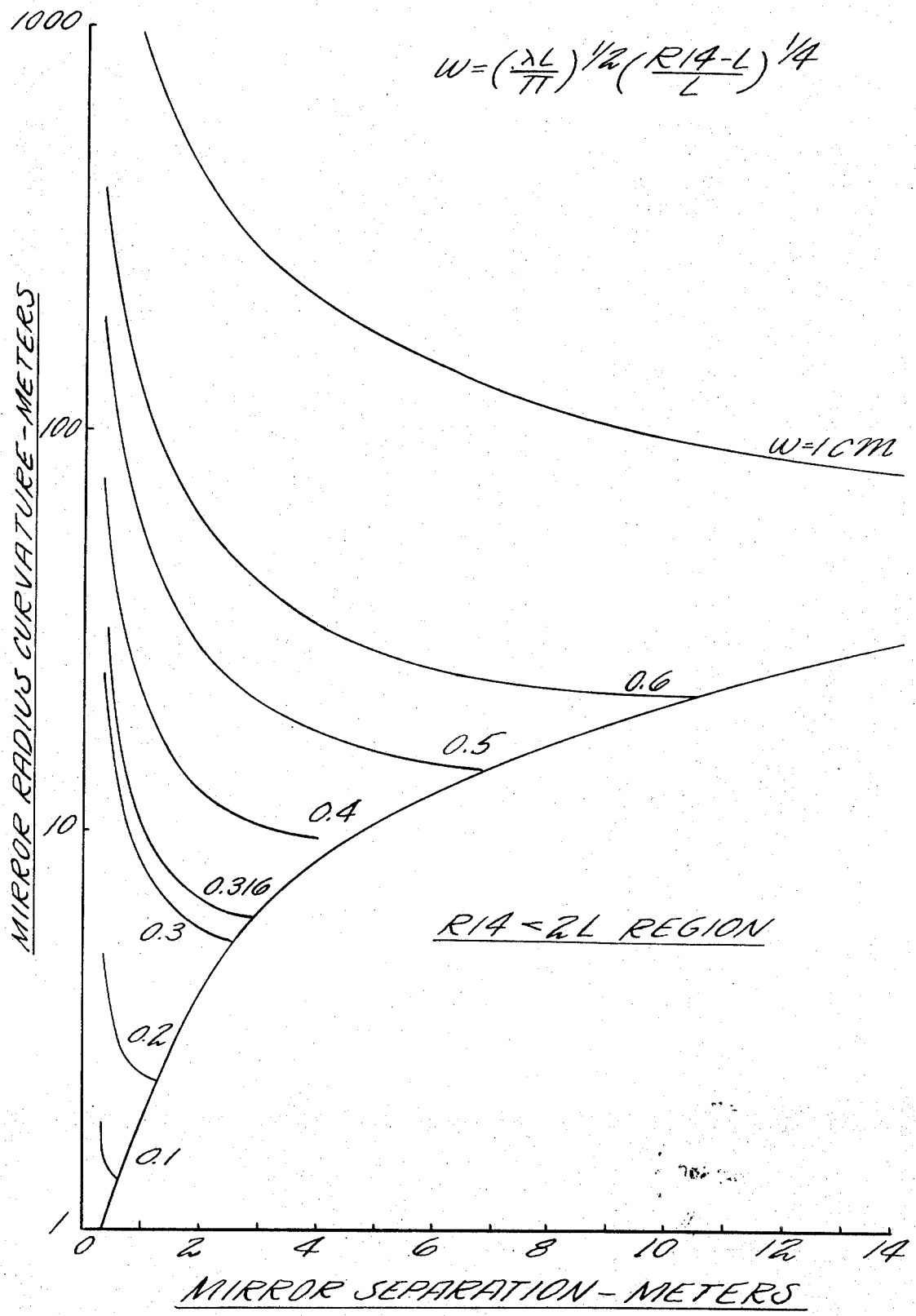
FIG. 2 is a graph illustrating the relationship between the concave mirror radius of curvature and the mirror separation distance for typical values of the mode spot size.

FIG. 2 shows the relationship between the radius of curvature R14 and the mirror separation 'L' for various mode spot sizes with a stable region of oscillation for the optical cavity. Once the fraction of the oscillator energy to be extracted from the oscillator is selected, the exact correspondence between $a$ and $w$ is determined by the relationship $$\eta = \exp\left[-\frac{2a^2}{w^2}\right]$$

where
  $\eta$ = power coupling factor
  $a$ = radius of the cavity flat and
  $w$ = radius of the mode spot size.

FIG. 3 illustrates the coupling efficiency of the mirror 16 as a function of the mode spot size for various values of dimension $a$.

The central hole in the annular mirror 26 is of radius $b$. As shown in FIG. 4, the dimension $b$, the radius of the fundamental mode $w$, and the radius $a$ of the flat surface 24 are approximately the same, but with small critical differences. The radius of the laser fundamental mode $w$ is related to the oscillator cavity dimensions as is described hereinbefore. FIG. 5 shows the relationship between the mode spot size $w$ and the mirror separation distance 'L' for various radii of curvature R14. In FIG. 4, the area 32 defines the area within the oscillator region filled by the fundamental mode of the laser. While $a$ is approximately equal to the dimension $w$, the magnitude of $a$ must be somewhat smaller to permit diffraction of some usable portion of the light oscillating within the cavity. The radius $b$ should be selected to be somewhat larger than $w$. The limitations on $b$ are that it must be sufficiently large to avoid distorting the primary mode of the laser oscillator, but not so large that the annular mirror does not intercept and focus the light diffracted by the mirror 16.

The radius of curvature R16 of the mirror 16 having a convex surface 22 and the radius of curvature R26 of the mirror 26 having a concave surface 30 are matched so that a stable resonator does not exist between the surface 22 and the surface 30. The avoidance of a stable resonance condition between these surfaces insures that the energy diffracted from the oscillator is available for focusing and further avoids excessive local mirror heating. As long as the mirror radii of curvature and separation distances $d$ are maintained outside the limits described by $$0 < \left[1 - \frac{d}{R_{26}}\right]\left[1 - \frac{d}{R_{16}}\right] < 1$$

a stable resonator does not exist between the mirror 26 and the mirror 16. Further, the distance of separation $d$, between the mirrors 16 and 26 must be selected to provide a clear line of sight from all points on the reflection surface 30 to the focus area $e$ for all of the energy diffracted by the mirror 16 and reflected by the surface 30. If this clear line of sight is not provided for, less than all of the diffracted energy will be focused at the work area.

The convex surface 22 provides expansion of the laser beam and this in turn allows both a long focal length and a small diameter laser spot. A small diameter spot is generally desired in metal working operations in order to have a high power density. It is of practical importance that the focal length be kept relatively long in laser metal working application: it has been found for example that a focus mirror with too short a focal length may result in sufficient splattering and contamination by the metal being worked to adversely effect the nearby reflecting surfaces; there can also be a problem of physical interference between the larger workpieces and the mirrors if too short a focal length is selected. The diameter 'D' of concave surface 30 which cooperates with the convex surface 22 actually sets the diameter '$D_s$' of the laser spot for a given focal length $f$ of said concave surface. These variables are interdependent as indicated in the relationship $$D_s = 2.44\lambda \left[\frac{f}{D}\right]$$

where
$D_s$ = diameter of the laser spot size
$\lambda$ = wavelength of the laser energy
$f$ = focal length of the focusing mirror and
$D$ = diameter of the focusing mirror.

It has been found that with a carbon dioxide laser, a ratio of focal length to focusing mirror diameter of approximately four is workable.

Although the invention has been shown and described with respect to preferred embodiments thereof, it should be understood by those skilled in the art that the foregoing and various changes and omissions in the form and detail thereof may be made therein without departing from the spirit and the scope of the invention.

Having thus described typical embodiments of my invention, that which I claim as new and desire to secure by Letters Patent of the United States is:

I claim:

1. A gas laser comprising:
   a plurality of mirrors forming an optical resonator cavity having a laser oscillation region of length L uniformly disposed about an axis through said mirrors;
   a first one of said mirrors having a spherical concave reflection surface with a radius of curvature $R_{14}$ forming one end of the cavity and defining one end of the oscillation region wherein the radius of curvature $Rk_{14}$ is greater than twice the length L;
   a second one of said mirrors having a compound reflection surface comprising a spherical convex reflection surface with a radius of curvature $R_{16}$ positioned symmetrically about a central flat reflection surface, the flat surface of radius $a$ being normal to said axis and disposed with respect to the first mirror to define the other end of the oscillation region which supports oscillation with a mode pattern radius of $w$ measured at the flat surface, the convex surface reflecting diffracted energy out of the oscillation region and away from said axis; and
   a third mirror having a spherical annular concave reflection surface with a radius of curvature $R_{26}$ facing said convex surface, said surface including a centrally located hole of radius $b$ therethrough to allow passage of the laser oscillations between said first mirror and said flat surface, the dimension $b$, $w$ and $a$ being interdependent according to the relation $b > w > a$, said third mirror being coaxially disposed about said axis and positioned a distance $d$ from the flat reflection surface to convergingly reflect the diffracted energy from said convex surface to an area external of the oscillation region.

2. A gas laser according to claim 1 wherein the diameter '$2b$' of the hole in said third mirror is sufficiently large to allow oscillations of the laser in the fundamental mode to pass therethrough unimpeded, and sufficiently small to permit said third mirror to intercept all of the diffracted energy reflected by said convex surface, and wherein a power coupling factor defined as $$\eta = \exp\left[-\frac{2a^2}{w^2}\right]$$

is maintained between approximately thirty and forty percent.

3. A gas laser according to claim 1 wherein the flat surface of said second mirror has a diameter '$2a$' to provide a Fresnel number of approximately one for the oscillation region.

4. A gas laser according to claim 1 wherein the convex surface of said second mirror and the concave surface of said third mirror define only an unstable resonator in the region therebetween according to the relationship $$0 < \left[1 - \frac{d}{R_{26}}\right]\left[1 - \frac{d}{R_{16}}\right] < 1.$$

5. In a gas laser, apparatus for the production and utilization of laser energy comprising:
   a pair of mirrors forming an optical resonator cavity having a laser oscillation region uniformly disposed about an axis through said mirrors;
   the first one of said mirrors having a concave reflection surface forming one end of the cavity and defining one end of the oscillation region;
   the second one of said mirrors having a compound reflection surface comprising a convex reflection surface positioned symmetrically about a central flat reflection surface which defines diffraction edge and is normal to said axis, the flat surface, cooperating with the first mirror to form the oscillation region and defining the other end thereof, the convex surface reflecting diffracted energy out of the oscillation region and away from said axis; and
   a third annular mirror having a concave reflection surface of diameter D, the third mirror positioned intermediate to said pair of mirrors and concentric about said axis and further positioned to intercept and focus all the diffracted energy from said convex surface to an area external of the oscillation region which is separated from the third mirror by a distance $f$, wherein the ratio of $f:D$ is approximately four.

* * * * *

PO-1050
(5/69)

UNITED STATES PATENT OFFICE
CERTIFICATE OF CORRECTION

Patent No. 3,681,709      Dated August 1, 1972

Inventor(s) CLYDE OWEN BROWN

It is certified that error appears in the above-identified patent and that said Letters Patent are hereby corrected as shown below:

Column 5, Claim 1, line 46      "$Rk_{14}$" should be -- $R_{14}$ --

Column 6, Claim 5, line 47      after "defines" insert

-- a --

Signed and sealed this 2nd day of January 1973.

(SEAL)
Attest:

EDWARD M. FLETCHER, JR.      ROBERT GOTTSCHALK
Attesting Officer      Commissioner of Patents